US010200703B2

(12) United States Patent
Su et al.

(10) Patent No.: US 10,200,703 B2
(45) Date of Patent: Feb. 5, 2019

(54) INTER-LAYER PREDICTION FOR SIGNALS WITH ENHANCED DYNAMIC RANGE

(71) Applicant: DOLBY LABORATORIES LICENSING CORPORATION, San Francisco, CA (US)

(72) Inventors: Guan-Ming Su, Fremont, CA (US); Qian Chen, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/534,170

(22) PCT Filed: Feb. 16, 2016

(86) PCT No.: PCT/US2016/018005
§ 371 (c)(1),
(2) Date: Jun. 8, 2017

(87) PCT Pub. No.: WO2016/133865
PCT Pub. Date: Aug. 25, 2016

(65) Prior Publication Data
US 2018/0262769 A1 Sep. 13, 2018

Related U.S. Application Data

(60) Provisional application No. 62/117,076, filed on Feb. 17, 2015.

(51) Int. Cl.
*H04N 19/33* (2014.01)
*H04N 19/30* (2014.01)
(Continued)

(52) U.S. Cl.
CPC ............. *H04N 19/33* (2014.11); *H04N 19/30* (2014.11); *H04N 19/463* (2014.11); *H04N 19/619* (2014.11)

(58) Field of Classification Search
CPC .. H04N 19/126; H04N 19/136; H04N 19/186; H04N 19/179; H04N 19/187;
(Continued)

(56) References Cited

U.S. PATENT DOCUMENTS 8,811,490 B2    8/2014  Su
9,066,070 B2    6/2015  Su
(Continued)

FOREIGN PATENT DOCUMENTS

EP    1694074    8/2006
EP    2675162    12/2013
(Continued)

OTHER PUBLICATIONS

Chou, Chun-Hsien et al "A Perceptually Optimized 3-D Subband Codec for Video Communication Over Wireless Channels" IEEE Transactions on Circuits and Systems for Video Technology, vol. 6, No. 1, Apr. 1, 1996, pp. 143-156.

*Primary Examiner* — Zhihan Zhou

(57) ABSTRACT

Pixel data of a video sequence with enhanced dynamic range (EDR) are predicted based on pixel data of a corresponding video sequence with standard dynamic range (SDR) and an inter-layer predictor. Under a highlights clipping constrain, conventional SDR to EDR prediction is adjusted as follows: a) given a highlights threshold, the SDR to EDR predictor is adjusted to output a fixed output value for all input SDR pixel values larger than the highlights threshold, and b) given a dark-regions threshold, the residual values between the input EDR signal and its predicted value are set to zero for all input SDR pixel values lower than the dark-regions threshold. Example processes to determine the highlights and dark-regions thresholds and whether highlights clipping is occurring are provided.

18 Claims, 4 Drawing Sheets

(51) Int. Cl.
*H04N 19/463* (2014.01)
*H04N 19/61* (2014.01)

(58) Field of Classification Search
CPC ...... H04N 19/90; H04N 19/142; H04N 19/30; H04N 19/132; H04N 19/182; H04N 19/36; H04N 19/619; H04N 19/33; H04N 19/463; G09G 2370/04; G09G 5/10
See application file for complete search history.

(56) References Cited

U.S. PATENT DOCUMENTS

| | | | |
|---|---|---|---|
| 9,264,681 B2 | 2/2016 | Gish | |
| 9,549,207 B2 | 1/2017 | Su | |
| 2007/0201560 A1* | 8/2007 | Segall | H04N 19/61 375/240.24 |
| 2013/0177066 A1* | 7/2013 | Ye | H04N 19/36 375/240.02 |
| 2013/0329778 A1* | 12/2013 | Su | H04N 19/126 375/240.01 |
| 2014/0185664 A1 | 7/2014 | Van Der Auwera | |
| 2014/0247869 A1* | 9/2014 | Su | H04N 19/30 375/240.03 |
| 2014/0294313 A1* | 10/2014 | Su | H04N 19/86 382/239 |
| 2014/0341305 A1* | 11/2014 | Qu | H04N 19/70 375/240.26 |
| 2017/0180734 A1 | 6/2017 | Su | |

FOREIGN PATENT DOCUMENTS

| | | |
|---|---|---|
| JP | 2010-213360 | 9/2010 |
| JP | 2014-518024 | 7/2014 |
| JP | 2015-501603 | 1/2015 |
| JP | 2015-084560 | 4/2015 |
| RU | 2503137 | 12/2013 |
| WO | 2013/103522 | 7/2013 |
| WO | 2014/053512 | 4/2014 |
| WO | 2014/099370 | 6/2014 |

\* cited by examiner

INTER-LAYER PREDICTION FOR SIGNALS WITH ENHANCED DYNAMIC RANGE

CROSS REFERENCE TO RELATED APPLICATIONS

This application claims the benefit of priority to U.S. Provisional Application No. 62/117,076, filed on Feb. 17, 2015, which is hereby incorporated by reference in its entirety.

TECHNOLOGY

The present invention relates generally to images. More particularly, an embodiment of the present invention relates to inter-layer prediction for encoding and decoding signals with enhanced dynamic range.

BACKGROUND

Audio and video compression is a key component in the development, storage, distribution, and consumption of multimedia content. The choice of a compression method involves tradeoffs among coding efficiency, coding complexity, and delay. As the ratio of processing power over computing cost increases, it allows for the development of more complex compression techniques that allow for more efficient compression. As an example, in video compression, the Motion Pictures Expert Group (MPEG) from the International Standards Organization (ISO) has continued improving upon the original MPEG-1 video standard by releasing the MPEG-2, MPEG-4 (part 2), H.264/AVC (or MPEG-4, part 10), and the H.265/HEVC coding standards.

Video signals may be characterized by multiple parameters, such as bit-depth, color space, color gamut, and resolution. Modern televisions and video playback devices (e.g., Blu-ray players) support a variety of resolutions, including standard-definition (e.g., 720×480i) and high-definition (HD) (e.g., 1920×1080p). Ultra high-definition (UHD) is a next generation resolution format with at least a 3,840×2,160 resolution (referred to as 4K UHD) and options to go as high as 7680×4320 (referred to as 8K UHD). Ultra high-definition may also be referred to as Ultra HD, UHDTV, or super high-vision. As used herein, UHD denotes any resolution higher than HD resolution.

Another aspect of a video signal's characteristic is it dynamic range. Dynamic range (DR) is a range of intensity (e.g., luminance, luma) in an image, e.g., from darkest blacks to brightest whites. As used herein, the term 'dynamic range' (DR) may relate to a capability of the human psychovisual system (HVS) to perceive a range of intensity (e.g., luminance, luma) in an image, e.g., from darkest blacks to brightest highlights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal vision (e.g., in one or more of a statistical, biometric or ophthalmological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms 'enhanced or extended dynamic range' (EDR), 'visual dynamic range,' or 'variable dynamic range' (VDR) may individually or interchangeably relate to the DR that is simultaneously perceivable by a HVS. As used herein, EDR may relate to a DR that spans 5-6 orders of magnitude. Thus while perhaps somewhat narrower in relation to true scene referred HDR, EDR nonetheless represents a wide DR breadth and may also be referred to as HDR. As used herein, the term 'simultaneous dynamic range' may relate to EDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using low bit-depth, non-linear luminance coding (e.g., 10-bits and logarithmic luminance coding), or high-precision (e.g., 16-bit) floating-point formats, such as the OpenEXR file format developed by Industrial Light and Magic.

To support backwards compatibility with legacy playback devices as well as new HDR or UHD display technologies, multiple layers may be used to deliver UHD and HDR (or EDR) video data from an upstream device to downstream devices. Given such a multi-layer stream, legacy decoders may use the base layer to reconstruct an HD SDR version of the content. Advanced decoders may use both the base layer and the enhancement layers to reconstruct an UHD EDR version of the content to render it on more capable displays. As appreciated by the inventors here, improved techniques for the layered coding of EDR video, especially at they relate to inter-layer prediction, are desirable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
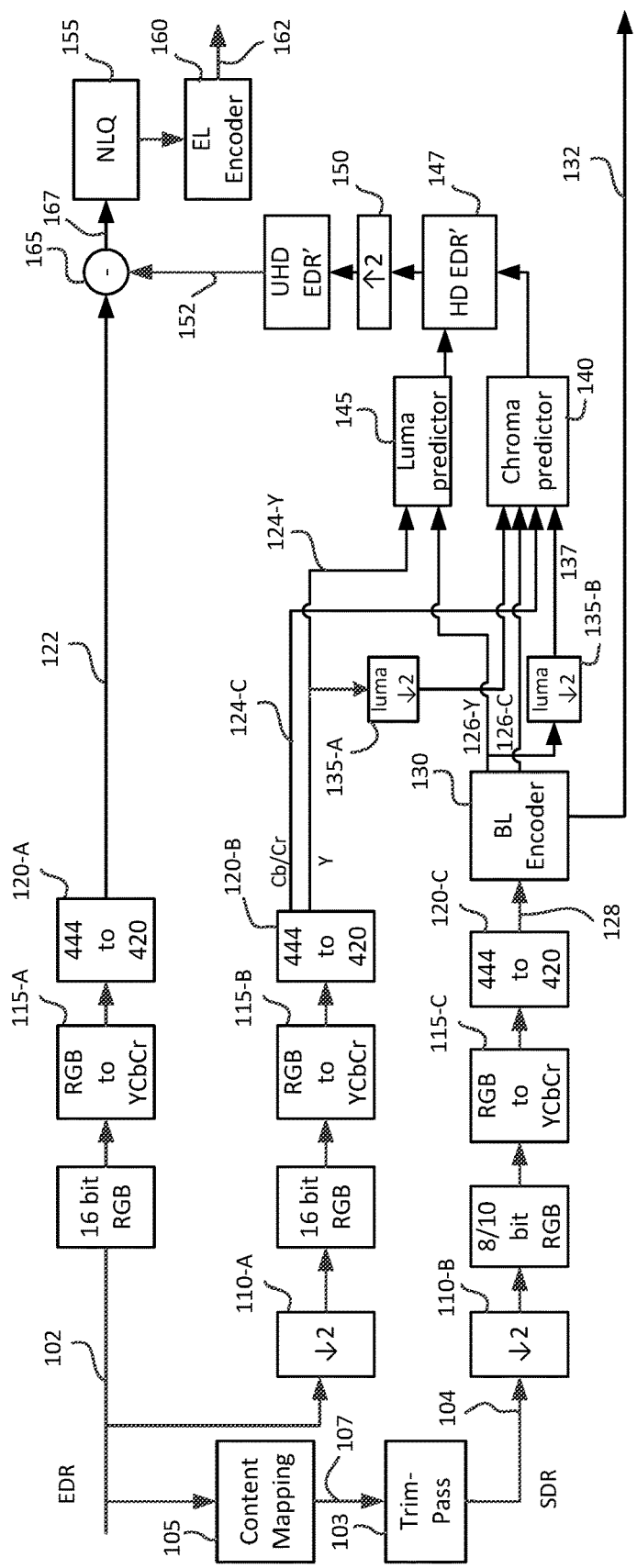
FIG. 1 depicts an example implementation of a layered EDR coding system with an inter-layer predictor according to an embodiment of this invention.

Inter-layer prediction as it applies to the layered coding of signals with enhanced dynamic range is described herein. Given an EDR input video signal that may be coded using a base layer (BL) SDR signal and a residual EDR enhancement layer (EL), an inter-layer predictor between the two layers is constructed by taking into consideration the characteristics of the highlights and the dark-regions of the input SDR video.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

Overview

Example embodiments described herein relate to inter-layer prediction in layered coding and decoding of video signals with enhanced dynamic range. Pixel data of a video sequence with enhanced dynamic range (EDR) are predicted based on pixel data of a corresponding video sequence with conventional dynamic range (SDR) and an inter-layer predictor. Under a highlights clipping constrain, conventional SDR to EDR prediction is adjusted as follows: a) given a highlights threshold, the SDR to EDR inter-layer predictor is adjusted to output a fixed output value for all input SDR pixel values larger than the highlights threshold, and b) given a dark-regions threshold, the residual values between the input EDR signal and its predicted value is set to zero for all input SDR pixel values lower than the dark-regions threshold.

In an embodiment, a decision on whether there is highlights clipping is based on statistical values derived from the SDR and EDR pixel values.

In an embodiment, the conventional inter-layer predictor comprises an 8-segment MSE predictor and the highlights threshold comprises the starting pivot point of the last segment in the MSE predictor.

In an embodiment, the dark-regions threshold is based on a degree of change computed based on cumulative variance values of the EDR values.

Layered Encoding of EDR Signals

Existing display and play-back devices, such as HDTVs, set-top boxes, or Blu-ray players, typically support signals of up to 1080p HD resolution (e.g., 1920×1080 at 60 frames per second). For consumer applications, such signals are now typically compressed using a bit-depth of 8 bits per pixel per color component in a luma-chroma color format where typically the chroma components have a lower resolution than then luma component (e.g., the YCbCr or YUV 4:2:0 color format). Because of the 8-bit depth and the corresponding low dynamic range, such signals are typically referred to as signals with standard dynamic range (SDR).

As new television standards are being developed, such as Ultra High Definition (UHD), it may be desirable to encode signals with enhanced resolution and/or enhanced dynamic range in a format that both legacy HDTV decoders and newer UHD decoders can process.

As described in PCT Application with Ser. No. PCT/US2013/073085, "Backward compatible coding for ultra-high definition signals with enhanced dynamic range," by G-M Su et al., filed on Dec. 4, 2013, which is incorporated herein by reference in its entirety, FIG. 1 depicts an embodiment of an example implementation of a system supporting backward-compatible coding of UHD signals with enhanced dynamic range (EDR). The encoder comprises a base layer (BL) Encoder (130) and an enhancement layer (EL) encoder (160). In an embodiment, BL Encoder (130) is a legacy encoder, such as an MPEG-2 or H.264 encoder, and EL Encoder (160) is a new standard encoder, such as an HEVC encoder. To support legacy BL decoders, BL encoder (130) is typically an 8-bit encoder; however, EL encoder (160) may support input streams with a higher bit depth, such as 10 bits, as specified by the H.264 and HEVC (H.265) standards. However, this system is applicable to coding EDR and SDR layers at any spatial resolution and bit depth using any combination of either known or future encoders, whether they are standard-based or proprietary.

As depicted in FIG. 1, an input signal, such as a movie or television broadcast, may be represented by two signals: an UHD EDR input (102) and an UHD SDR input (104). For example, the UHD EDR signal (102) may be a 4K (e.g., 3840×2160) resolution signal captured by an HDR camera and color-graded for an EDR display. The same signal may also pass through a content mapping process (105) to generate a tone-mapped or content-mapped SDR signal by applying any of known in the art tone-mapping or display management techniques. Optionally, or in combination with the content mapping process (105), SDR signal (104) may be generated from the EDR signal (102) or the SDR signal (107) by a colorist using a trim-pass color grading process (103). As used herein, the term "trim pass color grading process" denotes any manual adjustments of the colors, tone, contrast, and dynamics range of a video signal to match the characteristics of a target display according to a director's intend.

Without loss of generality, both of these input signals may be typically represented in the RGB color-space using 16-bit or equivalent (e.g., floating point) bit-depth representations. As used herein, the term n-bit signal denotes an image or video signal with one or more color components (e.g., RGB or YCbCr), wherein each pixel in any one of these color components (e.g., Y) is represented by an n-bit pixel value. Given an n-bit representation, each such pixel may take values between 0 and $2^n-1$. For example, in an 8-bit representation, for each color component, each pixel can take values between 0 and 255.

In an embodiment, UHD SDR signal (104) may be down-sampled into an HD SDR signal (e.g., 1080p), which is then color converted to a color format suitable for encoding using a legacy 8-bit encoder, e.g., in 8-bit YCbCr 4:2:0 color format. Such a conversion may comprise color transformations (such as RGB to YCbCr conversion 115-C) and chroma sub-sampling (e.g., 4:4:4 to 4:2:0 conversion 120-C). Thus, HD SDR signal (128) represents a backward-compatible signal representation of the original UHD EDR signal (102). Signal (128) may be encoded by BL encoder (130) to generate a backward-compatible coded bitstream (132). BL encoder (130) may compress or encode HD SDR signal (128) using any of the known or future video compression algorithms, such as MPEG-2, MPEG-4, part 2, H.264, HEVC, VP8, VP9, and the like.

Given UHD EDR signal (102), down-sampling (110-A) and color conversion processes (115-B and 120-B) may convert UHD EDR signal (102) into a reference prediction HD EDR signal (124). In a preferred embodiment, the down-sampling and color conversion processes (110-A, 115-B, and 120-B) (e.g., selected filters and color space) in this stage should be identical or as close as possible to the down-sampling and color conversion processes (110-B, 115-C, and 120-C) used to generate the HD SDR signal (128) in the base layer.

Following the UHD EDR to HD EDR transformation, the output of HD EDR signal (124) is separated into luma (Y 124-Y) and chroma (CbCr 124-C) components, which are applied to determine the prediction coefficients for luma predictor (145) and chroma predictor (140).

Given HD SDR signal (128), BL Encoder (130) generates not only coded BL bitstream (132) but also BL signal (126) which represents HD SDR signal (128) as it will be decoded by a corresponding BL Decoder. In some embodiments, signal (126) may be generated by a separate BL decoder (not shown) following BL encoder (130). In some other embodiments, signal (126) may be generated from the feedback loop used to perform motion compensation in BL encoder (130). As depicted in FIG. 1, the output of HD EDR signal (126) may also be separated into its luma (Y 126-Y) and chroma components (CbCr 126-C) which are applied to Luma predictor (145) and Chroma predictor (140) to predict HD EDR's signal (147). In some other embodiments, down-sampling (110-A, 110-B) may be skipped, so all processing is performed at full resolution.

In an embodiment, Luma predictor (145) may comprise a polynomial predictor to predict luma components of HD EDR' signal (147) based on the luma pixel values of base layer HD SDR signal (126-Y). In such a predictor, a luma pixel component may be predicted without taking into consideration any pixel values in any of the other color components of the signal. For example, let $s_i$ denote the luma pixel values of BL HD SDR signal (126-Y), then, without loss of generality, a third-order polynomial predictor may be expressed as $$\hat{v}_i = \sum_{k=0}^{3} a_k s_i^k, \quad (1)$$

where $a_k$, k=0 to 3, are the predictor coefficients. In an embodiment, the predictor coefficients may be determined by any known in the art minimization-error techniques, such as minimizing the mean-square-error (e.g., $\|v_i - \hat{v}_i\|^2$) between the predicted value ($\hat{v}_i$) and the luma pixel values in the reference HD EDR signal (124-Y) ($v_1$).

In an embodiment, chroma predictor (140) may also be a polynomial predictor, similar to the one described earlier; however, in a preferred embodiment, chroma predictor (140) comprises a multi-color channel, multiple regression (MMR), predictor, as the ones described by G-M Su et al. in U.S. Pat. No. 8,811,490, "Multiple color channel multiple regression predictor," which is incorporated herein by reference in its entirety. An MMR predictor predicts the chroma components of the HD EDR's signal using information from both the luma and the chroma pixel values in the HD EDR reference signal (124) and the base layer HD SDR signal (126). The prediction coefficients in the MMR model may also be determined using mean-square-error minimization techniques by minimizing the MSE between the predicted chroma values and luma and chroma pixel values of the reference HD EDR signal (124).

Because both the HD SDR signal (126) and the reference HD HDR signal (124) are in a YCbCr 4:2:0 format, where the spatial resolution of the luma component is double the spatial resolution of each of the chroma components, the luma components of both of these signals are down-sampled (135-A and 135-B) before being applied to the chroma predictor (140). In a preferred embodiment, the filters used in luma down-sampling (135-A) and (135-B) are the same as the chroma down-sampling filters used in the 4:4:4 to 4:2:0 processing (120). Luma and Chroma prediction coefficients may be updated at a variety of time intervals of interest, such as per scene, per group of pictures, or per frame. Prediction filter coefficients may be communicated to a video decoder by a variety of methods, such as embedding their values in the bitstream as auxiliary data or metadata.

Given predicted HD EDR' signal (147), up-sampler (150) generates an UHD EDR' signal (152), which is used to generate the residual signal (167). Because UHD EDR's signal is in the preferred coding format (e.g., YCbCr 4:2:0), additional color transformation (115-A) and chroma down-sampling (120-A) steps may be needed to convert the original UHD EDR signal (102) from the original format (e.g., RGB) to UHD EDR signal (122) in the preferred coding format. Signals (122) and (152) are subtracted to create the EL residual signal (167).

In an embodiment, color transformation (115-A) and chroma sub-sampling processes (120-A) are identical or as close as possible to the color transformation (115-B and 115-C) and chroma sub-sampling processes (120-B and 120-C) being used to generate the BL-coded signal (128) and the prediction signal (124).

In an embodiment, before coding EL signal (167) by EL encoder (160), the signal may be processed by a non-linear quantizer (NLQ) (155). Examples of suitable non-linear quantizers may be found in PCT patent Application Ser. No. PCT/US2012/034747 (published as WO2012/148883), "Non-Linear VDR Residual Quantizer," filed on Apr. 24, 2012, which is incorporated herein by reference in its entirety. The output of the NLQ (155) may be compressed using an EL encoder (160) to generate a coded EL bitstream (162) which may be transmitted to suitable decoders. Furthermore, in some embodiments, residual (167) may also be spatially down-sampled by a down-sampling module (not shown). Such down-sampling (e.g., by a factor of two or four in both dimensions) improves coding efficiency, especially at very low bit rates. Down-sampling may be performed either before or after the non-linear quantizer (155).

EL encoder (160) may be any suitable encoder, such as those described by the MPEG-2, MPEG-4, H.264, HEVC specifications and the like. In an embodiment, BL coded bitstream (132), EL coded bitstream (162), and metadata related to the coding process (e.g., the predictor parameters or look-up tables) may be multiplexed into a single bit stream (not shown).

In some embodiments, the base line HD SDR signal (128) may already be available to encoder (100) in the correct resolution and color format. In such a case, the down-sampling (110-B) and color transformations steps (115-C and 120-C) may be bypassed.

In some embodiments, the UHD EDR signal (102) may be available in lower or higher precision than 16-bit; however, its precision is expected to be higher than 8 bits (e.g., 10 bits or 12 bits). Similarly, UHD SDR signal (104) may already be available in a precision lower than 16 bits (e.g., 8 bits or 10 bits).

Inter-Layer Prediction

Background and Nomenclature

Let $s_{ji}$ denote the i-th pixel at frame j of an SDR signal (e.g., 126-Y). Let $v_{ji}$ denote the corresponding co-located pixel in EDR signal (e.g., 124-Y). Let $\hat{v}_{ji}$ denote the corresponding co-located predicted EDR pixel (e.g., 147). Suppose there are P pixels in the given picture. Given, without limitation, a 2-nd order polynomial predictor, then for the i-th pixel, the predicted value can be expressed as $$\hat{v}_{ji} = m_{j0} + m_{j1} \cdot s_{ji} + m_{j2} \cdot (s_{ji})^2, \quad (2)$$

where $m_{ji}$, for $i=0, 1$, and 2, denote the prediction coefficients.

In an embodiment, the prediction coefficients may be determined to minimize a distortion metric using a prediction cost function, such as the mean square error (MSE) between the original and the predicted EDR pixel values (e.g., $\|v_i - \hat{v}_i\|^2$). Equation (2) may be expressed in a matrix/vector form, such as $$\begin{bmatrix} \hat{v}_{j0} \\ \hat{v}_{j1} \\ \hat{v}_{j2} \\ \vdots \\ \hat{v}_{j,P-1} \end{bmatrix} = \begin{bmatrix} 1 & s_{j0} & s_{j0}^2 \\ 1 & s_{j1} & s_{j1}^2 \\ 1 & s_{j2} & s_{j2}^2 \\ \vdots & \vdots & \vdots \\ 1 & s_{j,P-1} & s_{j,P-1}^2 \end{bmatrix} \begin{bmatrix} m_{j0} \\ m_{j1} \\ m_{j2} \end{bmatrix}, \quad (3)$$

or $$\hat{v}_j = S_j m_j,$$

where $\hat{v}_j = \begin{bmatrix} \hat{v}_{j0} \\ \hat{v}_{j1} \\ \hat{v}_{j2} \\ \vdots \\ \hat{v}_{j,P-1} \end{bmatrix}$, $$S_j = \begin{bmatrix} 1 & s_{j0} & s_{j0}^2 \\ 1 & s_{j1} & s_{j1}^2 \\ 1 & s_{j2} & s_{j2}^2 \\ \vdots & \vdots & \vdots \\ 1 & s_{j,P-1} & s_{j,P-1}^2 \end{bmatrix}, \text{ and}$$

$$m_j = \begin{bmatrix} m_{j0} \\ m_{j1} \\ m_{j2} \end{bmatrix}.$$

Then, a least squares solution may be obtained as $$m_j = ((S_j)^T (S_j))^{-1} ((S_j)^T v_j), \quad (4)$$

where $$v_j = \begin{bmatrix} v_{j0} \\ v_{j1} \\ v_{j2} \\ \vdots \\ v_{j,P-1} \end{bmatrix}$$

denotes the reference EDR pixel values (124). Let $B_j$ and $a_j$ be defined as:

$$B_j = (S_j)^T (S_j) \quad (5)$$

and $$a_j = (S_j)^T v_j. \quad (6)$$

Then, from equation (4)

$$m_j = B_j^{-1} a_j. \quad (7)$$

In an embodiment, the performance of a predictor (e.g., 145) could be improved using piecewise polynomial prediction. In such an embodiment, instead of using a single polynomial predictor (e.g., such as those depicted in equations (1) or (2)) for the whole range of possible SDR pixel values, one could divide the SDR pixel range (e.g., [0, K−1], where K=$2^B$ and B denotes the bit depth of the SDR signal) to two or more sub-ranges and then apply a predictor to each of the sub-ranges. In such an implementation, one needs to find the "pivot" or boundary points which separate the different piecewise polynomial predictors. For example, assuming piecewise polynomial prediction using two polynomials, in video prediction, one needs to identify pivot point $s_j$, in the SDR domain which will partition the SDR range in to two ranges: $[0, s_{j_v})$ and $[s_{j_v}, K-1)$. The piecewise polynomials may be linear or non-linear, all of the same order, or with different orders.

As an example, the PCT/US2015/14482 Application, filed on Feb. 4, 2015, which is incorporated herein by reference in its entirety, describes methods to derive such piecewise polynomial predictors. In a preferred embodiment, Luma prediction (145) is performed using eight second-order polynomials. While such a predictor works well for SDR signals generated through a content mapping process only (e.g., (105)), experimental results indicate that the prediction methods need to be adjusted when the SDR signal (104) is generated through a trim-pass color grading process (103).

It has been observed that using a traditional or conventional predictor (to be denoted here, without loss of generality, as an "MSE predictor") with trim-pass data generates unusually larger residual errors in the highlights parts of the input video signal. This may be an artifact of the manual adjustments performed by the colorists, who typically perform more adjustments in the highlights than in mid-tones or dark areas of the original EDR input. These larger than expected residual values strain the EL encoder (160) and under low bit rate constrains worsen the overall quality of the received reconstructed EDR signal, for example, by exhibiting blocky artifacts. While artifacts may be generated in both the dark areas and the highlights, artifacts in the highlights are much more noticeable. Hence, in an embodiment, under a bit rate constraint, more bits are allocated to the highlights regions than the darks. In an embodiment, a proposed solution for a novel predictor (to be denoted from now on as a "highlights predictor" to differentiate it from the conventional MSE predictor) includes three main components:

a) Determining whether there is highlights clipping (typically, but not necessarily, due to a trim pass step)

If there is highlights clipping, then adjusting the SDR-to-EDR prediction process as follows:

b) Setting the predictor output to a fixed value for SDR inputs larger than a highlights threshold; and c) Setting the residual output to zero for residual values lower than a darks threshold Example embodiments for detecting highlight clipping and setting the two thresholds are described next.

Detecting Highlights Clipping

It has been observed that a trim pass process (103) with a standard MSE predictor yields larger residuals or clippings (167) in the highlights. In such cases, typically, there exist multiple one-to-many SDR to EDR mappings. In an example embodiment, highlights clipping (which causes increased prediction errors) may be detected before the actual prediction process based on the collected statistics of the pixel values in the input SDR and EDR signals.

Assume there are B bits allocated for an SDR pixel component (e.g., B=8 or B=10). In frame j, for i=0, ... $2^B-1$, for EDR pixels $v_{ji}$ and their corresponding SDR pixels $s_{ji}$ one may measure the following values:

h[i]: The histogram of SDR pixel values, namely the number of pixels whose SDR value is i.

b[i]: The sum of EDR values whose corresponding SDR value is i.

b2[i]: The sum of squared EDR values whose SDR value is i.

mean[i]: The mean of the EDR values whose SDR value is i.

var[i]: The variance of the EDR values whose SDR value is i.

For example, Table 1 denotes an example process of computing these values using pseudo code.

TABLE 1

Routine to generate SDR-to-EDR mapping pixel statistics

```
// STEP 1: collect statistics for each pixel
//K = 2^B
//Set h[ ], b[ ], and b2[ ] to zero
for ( i = 0 ; i < P, i++ ){
    h[s_ji] ++ ;
    b[s_ji] = b[s_ji] + v_ji ;
    b2[s_ji] = b2[s_ji] + v_ji * v_ji ;
}
// STEP 2: calculate the variance for each bin
for ( i = 0; i < K; i++ ){
    if ( h[i] > 0 ){
        mean[i] = b[i] / h[i] ;
        var[i] = b2[i] / h[i] - mean [i]*mean[i] ;
    }
    else{
        mean[i] = 0 ;      var[i] = 0;
    }
}
```

The pixel statistics may also be expressed as:

$$b[i] = \sum_{i=s_{ji}} v_{ji},$$

$$b2[i] = \sum_{i=s_{ji}} v_{ji}^2,$$

$$mean[i] = \frac{b[i]}{h[i]},$$

$$var[i] = \frac{b2[i]}{h[i]},$$

for i=0, 1, 2, . . . , K−1, and h[i]>0.

In a typical video processing environment, legal or allowable SDR values may be bounded by a value smaller than the maximum possible (e.g., $2^B-1$). Let this value be denoted U (e.g., pixel values larger than U may be considered illegal values). For example, for SMPTE-coded data, in an embodiment, U=235 for B=8 and U=940 for B=10. Let $M_j$ denote the EDR pixel value in frame j for which var[i] is maximum. Given a histogram threshold $T_h$ (e.g., $T_h$=64), in an embodiment, a potential clipping in the highlights is determined if the histogram values for a range SDR values within $M_j$ (e.g., $M_1=U \mp L$ where L is a positive integer, e.g., L=3) are above the $T_h$ threshold. Table 2 describes in pseudo code an example routine for determining highlights clipping.

TABLE 2

Routine to decide whether there is highlights clipping

// For each frame j in the same scene with F frames
STEP 1:
$$M_j = \arg \max_{i=[0...2^B-1]} \{var[i]\}$$

STEP 2:
$$D_j = \left(\left(\sum_{k=-L}^{L} ((M_j == U+k) \&\& (h[U+k] > T_h))\right) \geq 1\right)$$

// $D_j$ = 1 means highlights clipping is detected.
// Given a scene with F frames, and a scene threshold Ts, a final
// decision is made for the whole scene as follows:

if $\frac{1}{F}\sum_{j=0}^{F-1} D_j > Ts$ then apply highlights prediction
else
    apply conventional prediction
end As noted in Table 2, in some embodiments it is preferred to determine highlights clipping at the scene level rather than the frame level. For example, in an embodiment, highlights clipping for a whole scene may be determined if at least 10% of the individual frames exhibit clipping (e.g., Ts=0.1). As used herein, the terms 'scene' or 'shot' for a video sequence may relate to a series of consecutive frames in the video signal sharing similar color and dynamic range characteristics. Because of the consecutive nature of video prediction in most video compression formats, it is preferable to adjust the prediction parameters only at boundaries that match the typical boundaries of a video encoder, such as scene changes or a new group of pictures (GOP).

Persons with ordinary skills in the art will appreciate that var[i] may be replaced by its square root (or the standard deviation) and all thresholds may be adjusted accordingly. Furthermore, Step 2 in Table 2 may easily be computed for different values of L (e.g., L=0, 2, or 3) depending on the available computational resources. In an embodiment, L=3 for 8-bit signals and L=12 for 10-bit signals.

Embodiments of a Highlights Predictor

As described earlier, in an embodiment, an MSE predictor may be designed as a multi-segment predictor. The segments may be either of uniform length or non-uniform length. For example, for an 8-segment MSE predictor, the pivot points defining the eight segments may be 0, 31, 62, 93, 124, 155, 186, 217, and 255 for B=8 and 0, 127, 254, 381, 508, 635, 762, 889, and 1023 for B=10. In an embodiment, the highlights predictor is identical with an MSE predictor for all segments, except for its tail end, which deals with highlights, e.g., pixel values larger than $T_{SH}$.

Let $\hat{v}_{ji}=f_{pred}(s_{ji})$ denote a function characterizing a conventional prediction function (e.g., an MSE predictor), which does not take into consideration highlights clipping. It has been observed that when highlights clipping occur, video quality may be improved if such a predictor can be adjusted to generate a fixed output value predictor for $s_{ji}>T_{SH}$, that is:

$$\hat{v}_{ji} = \begin{cases} sh & \text{if } s_{ji} > T_{SH} \\ f_{pred}(s_{ji}) & \text{otherwise} \end{cases}, \quad (8)$$

where $T_{SH}$ is a threshold smaller than $2^B-1$ and sh is a fixed value. Intuitively, one may argue that this approach will yield a worse performance, because with a fixed predicted value the residual error should increase; however, in effect, this approach forces the majority of the highlights to be coded in the enhancement layer as an "image" instead of random residuals, hence the coding with standard video encoders is more efficient and the overall quality improves.

In an embodiment, the sh value may be determined as follows:
1. Select a threshold $T_{SH}<U<2^B-1$ (e.g., the starting point of the last segment in a multi-segment predictor or a value close to approximately 80% of the total dynamic range)
2. Collect all SDR pixels smaller than $T_{SH}$ and their corresponding EDR pixels
3. Construct an MSE multi-segment predictor based on the above samples
4. Set $sh=f_{pred}(T_{SH})$. For example, for B=10, an MSE predictor may be designed for SDR pixels values 0 to 889, then $sh=f_{pred}(889)$.
5. Adjust the predictor to output a fixed value (sh) for all SDR pixel values larger or equal to $T_{SH}$.

As an example, for B=8, $T_{SH}=217$, and for B=10, $T_{SH}=889$.

Residual Masking in Dark Regions

Experimental results have shown that the variance values (e.g., var[i]) are typically monotonic, increasing from low pixel values (darks) to high pixel values (highlights). In an embodiment, to allocate more bits to highlights than darks and improve overall quality, all residuals below a predefined SDR value threshold are masked and set to zero (or any other very small fixed value). In other words, let $T_{SL}<T_{SH}$ denote an SDR threshold. Let $$e_{ji}=\hat{v}_{ji}-v_{ji},$$

Then, in an embodiment:

$$e_{ji}=0 \text{ if } s_{ji}<T_{SL}. \quad (9)$$

Alternatively, if $\hat{v}_{SL}=f_{pred}(T_{SL})$ denotes the output of the predictor for $s_{ji}=T_{SL}$, then $$e_{ji}=0 \text{ if } v_{ji}<\hat{v}_{SL}.$$

In an embodiment, the threshold $T_A$ can be identified using the following process:
1. Interpolate missing points in variance var[i];
2. Smooth the var[i] values;
3. Compute a cumulative mean of var[i];
4. Define $T_{SL}$ as a function of the change in the computed cumulative mean values.

An example process in pseudo code is given in Table 3.

TABLE 3

Example process to identify dark-regions threshold $T_{SL}$

```
// STEP 1: fill up the codeword without any variance data
// K = 2^B
for ( i = 0; i < K; i++ ) {
    if( var[i] == 0 ) { // no data, need interpolation
        find_L_flag = 0;
        find_R_flag = 0;
        // (A) find the nearest valid left neighbor
        for( j = i ; j >= 0; j -- ) {
            if( var[j] > 0 ) {
                s_L = j;
                find_L_flag = 1;
                break;
            }
        }
```

TABLE 3-continued

Example process to identify dark-regions threshold $T_{SL}$

```
        // (B) find the nearest valid right neighbor
        for( j = i ; i < K ; j ++ ) {
            if( var[j] > 0 ) {
                s_H = j;
                find_R_flag = 1;
                break;
            }
        }
        // (C) linear interpolation
        If( ( find_L_flag == 1 ) && (find_R_flag == 1 ))
```

$$var[i] = \frac{s_H - i}{s_H - s_L}var[s_L] + \frac{i - s_L}{s_H - s_L}var[s_H]$$

```
        else if( ( find_L_flag == 0 ) && (find_R_flag == 1 ))
            var[i] = var[s_H]
        else if( ( find_L_flag == 1 ) && (find_R_flag == 0 ))
            var[i] = var[s_L]
    }
}
// STEP 2: smoothing;
// STEP 2(a) here is a simple 3-tap filtering
for( i = 1; i < K-1; i++ ) {
    σ̄_i = 0.25 · var[i − 1] + 0.5 · var[i] + 0.25 · var[i + 1]   (T3.1)
}
// STEP 2(b): calculate cumulative average: the mean value in each
growing window
C = 0;
for( i = 0; i < K; i++ ) {
    C = C + σ̄_i;
```

$$\hat{\sigma} = \frac{C}{i+1} \quad (T3.2)$$

```
}
// STEP 2(c): find difference between each smooth value
σ̂_{-1} = 0
for( i = 0; i < B; i++ ) {
    θ_i = σ̂_i − σ̂_{i−1}                                       (T3.3)
}
// STEP 3: find θ_W within a dark window whose codeword is within
threshold W_L and W_H
    θ_W = max {θ_i | W_L ≤ i ≤ W_H}                            (T3.4)
// search the smallest codeword (larger than W_H) whose value is α
times of θ_W
```

$$T_{SL} = \arg\min_{i>W_H}\{\theta_i > \alpha \cdot \theta_W\} \quad (T3.5)$$

In their more general form, equations (T3.1) and (T3.2) may also be expressed as:

$$\overline{\sigma}_i = \sum_{n=-A}^{A} c_n \text{var}[i+n], \text{ for } i = 0, 1, \ldots, (K-1)-A, \quad (10)$$

$$\hat{\sigma}_d = \frac{1}{d+1}\sum_{i=0}^{d} \overline{\sigma}_i, \text{ for } d = 0, 1, 2, \ldots, K-1, \quad (11)$$

where $c_n$, for $n=-A, -A+1, \ldots, A-1, A$, denotes the coefficients of a (2A+1)-tap filter used to smooth the variance values.

In an embodiment, for B=8, $W_L=45$, $W_H=75$, and $\alpha=1.5$. Given a scene with F frames, given $T_{SL}(j)$ values for the j-th frame, an overall threshold may be defined as $$T_{SL} = \text{int}\left(\frac{1}{F}\sum_{j=0}^{F-1} T_{SL}(j)\right) \quad (12)$$

Figure 2A:
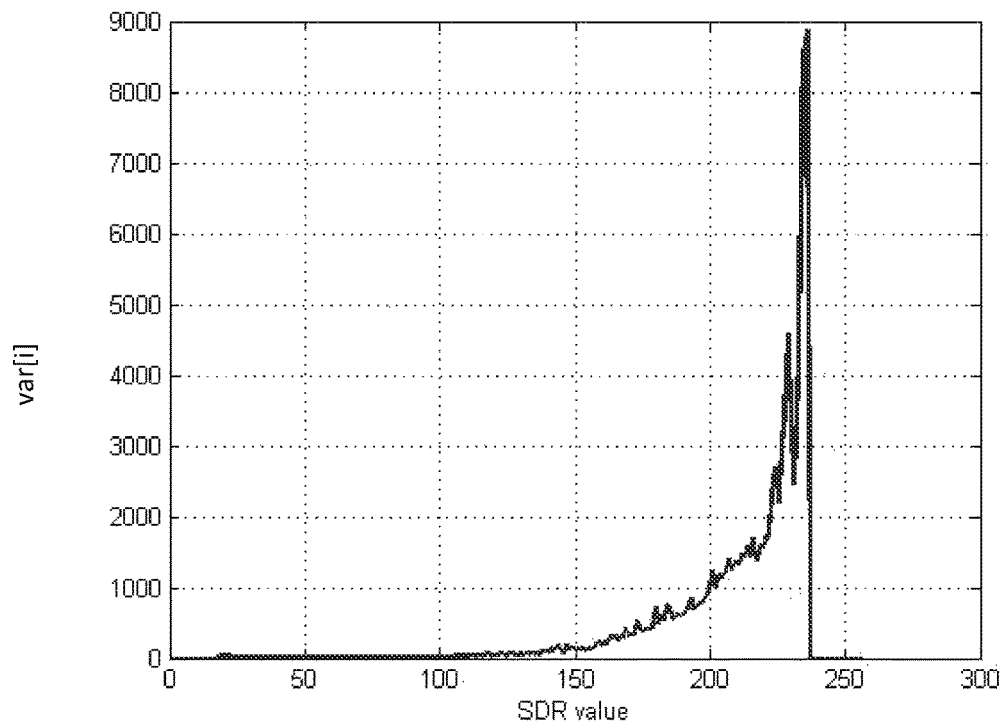
FIGS. 2A-2D depict examples of computed pixel statistics according to an embodiment of this invention.
Figure 2B:
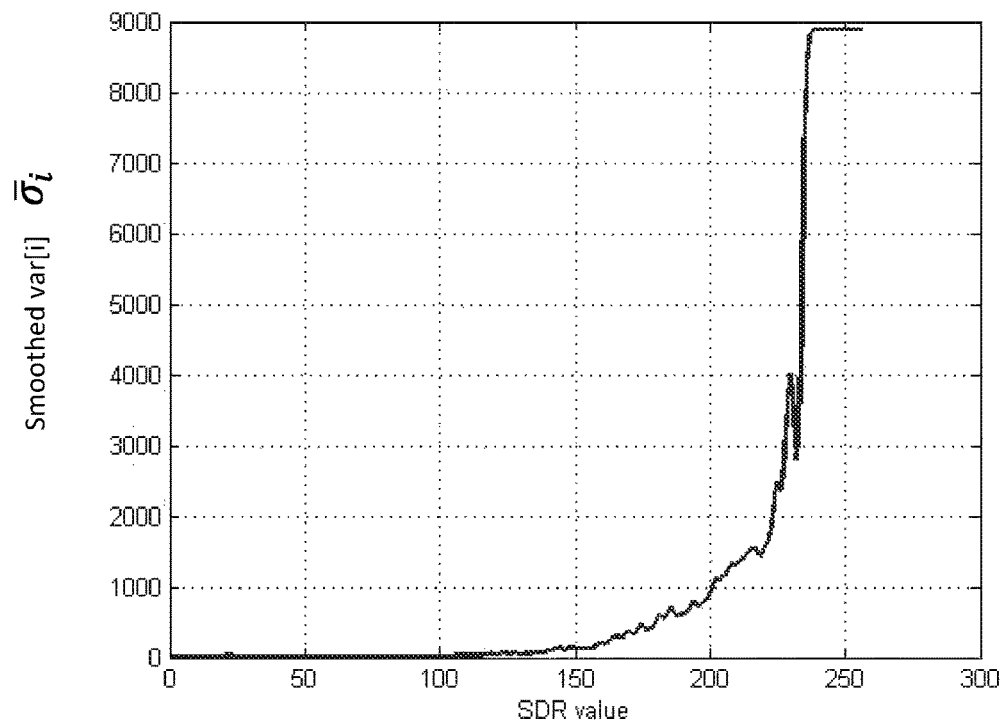
Figure 2C:
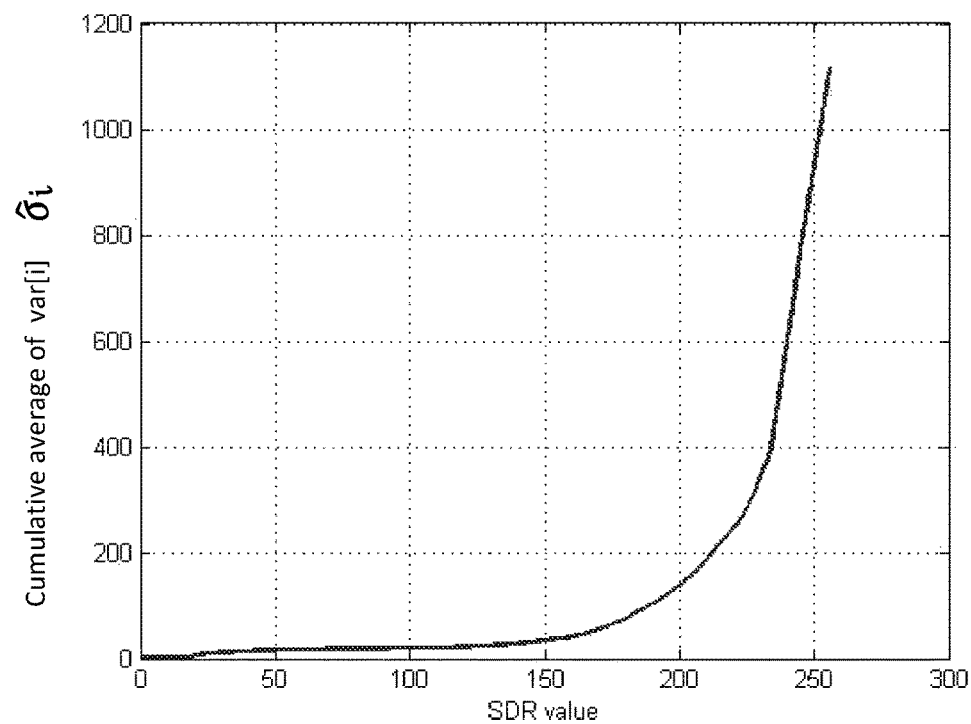
Figure 2D:
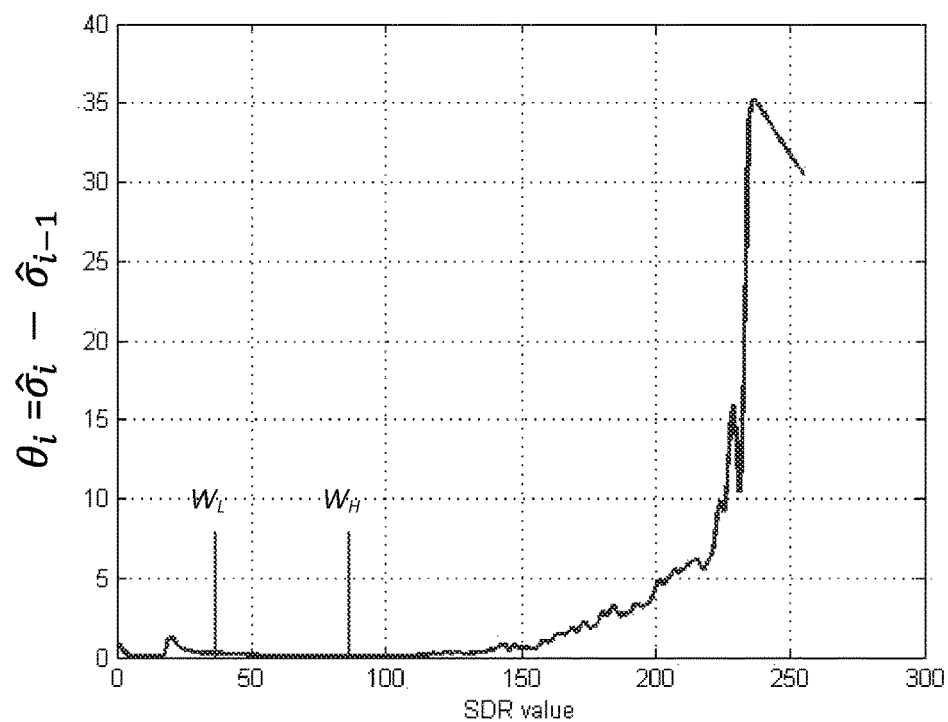

FIGS. 2A to 2D depict examples of the output steps of the process described in Table 3 for a single frame. FIG. 2A depicts an example of the var[i] values after the histogram variance interpolation step. As depicted in FIG. 2A, these values are rather "noisy." FIG. 2B depicted an example output after applying a low-pass filter to the values of FIG. 2A to generate smoothed var[i] values $\bar{\sigma}_i$. FIG. 2C depicts the corresponding $\bar{\sigma}_i$ values, and FIG. 2D depicts the output of $\theta_i = \bar{\sigma}_i - \bar{\sigma}_{i-1}$. A threshold $T_{SL}=100$ for 8-bit data appears to satisfy equation (T3.5). In some embodiments, a fixed threshold of $T_{SL}=100$ for 8-bit data appears to be satisfactory for a variety of motion video clips. Hence, some embodiments may use a fixed dark regions threshold (e.g., $T_{SL}=100$) and bypass the process to find an optimal threshold.

Figure 3:
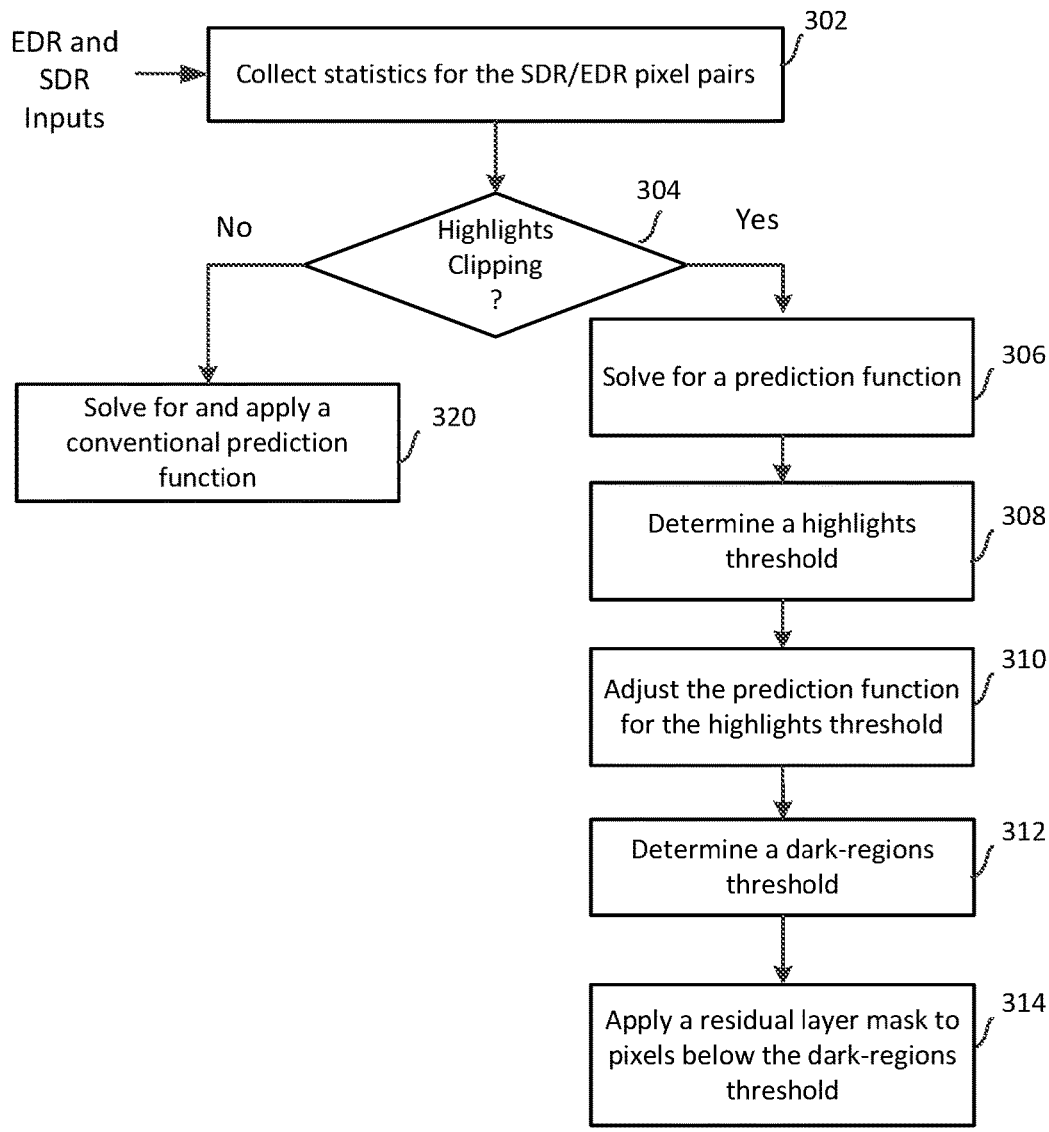
FIG. 3 depicts an example process for generating an inter-layer predictor according to an embodiment of this invention.

FIG. 3 depicts an example process for generating an inter-layer predictor according to an embodiment of this invention. As depicted in FIG. 3, input to this process are EDR and SDR frames (102, 104), each one representing the same scene, but at a different dynamic range and/or color grade. In step (302), statistics related to the pixels of the pairs of SDR and EDR data are collected. Examples of such statistics include the SDR histogram and the corresponding EDR variance or standard deviation values (e.g., h[i], var[i]), as discussed in relation to the algorithm listed in Table 1. These statistical data are then applied in step (304) to decide whether the predictor needs to be adjusted by applying a highlights predictor. If no highlights clipping is detected, then, in step (320), a known in the art conventional predictor (e.g., a multi-segment MSE Predictor) may be applied as the inter-layer predictor. An example of a highlights clipping test process was presented in Table 2.

If highlights clipping is detected, then, as discussed earlier, a more efficient inter-layer predictor may be designed as follows:

a) In step (306), as in step (320), a prediction function $f_{pred}(s_{ji})$ is determined. This function is based on any known in the art designs (e.g., a multi-segment MSE Predictor and the like).

b) In step (308) a highlights threshold is determined. For example, in an eight-segment predictor, the highlights threshold may be defined as the starting point of the last segment or approximately 85% of the dynamic range.

c) In step (310), given the highlights threshold (e.g., $T_{SH}$), the prediction function of step (306) is adjusted so that $$\hat{v}_{ji} = \begin{cases} sh & \text{if } s_{ji} > T_{SH} \\ f_{pred}(s_{ji}) & \text{otherwise} \end{cases}$$

d) In step (312), based on the collected statistics in step (302), a darks-region threshold (e.g., $T_{SL}$) is determined. An example of such a process was given in Table 3.

e) Finally, in step (314), the darks-region threshold from step d) is used to create a residual mask such that $e_{ji}=0$ if $s_{ji} < T_{SL}$.

Alternatively, if $\hat{v}_{SL} = f_{pred}(T_{SL})$, then $e_{ji}=0$ if $v_{ji} < \hat{v}_{SL}$.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to inter-layer prediction, such as those described herein. The computer and/or IC may compute any of a variety of parameters or values that relate to inter-layer prediction as described herein. The encoding and decoding embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to inter-layer prediction as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to inter-layer prediction are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for inter-layer prediction with a processor, the method comprising:

accessing a first video signal with a first dynamic range (EDR);

accessing a second video signal representing the first video signal in a second dynamic range (SDR), wherein the second dynamic range is lower than the first dynamic range;

generating with the processor a prediction function to predict pixels of the first video signal in response to pixels of the second video signal;

determining a highlights threshold and adjusting the prediction function to output a fixed output value for pixel values of the second video signal larger than the highlights threshold;

applying the second video signal to the adjusted prediction function to generate pixel values of an estimated first video signal;

determining a residual signal based on the first video signal and the estimated first video signal;

determining a darks region threshold; and for pixel values of the second video signal lower than the darks threshold setting corresponding pixel values of the residual signal to zero.

2. The method of claim 1, further comprising:

encoding using a first video encoder the second video signal to generate an encoded base layer signal; and encoding using a second video encoder a function of the residual signal to generate an encoded enhancement layer signal.

3. The method of claim 1, further comprising, before generating with the processor the prediction function to predict pixels of the first video signal in response to pixels of the second video signal, a step to determine whether there is potential highlights clipping in the predicted pixels of the first video signal or not, wherein determining whether there is potential highlights clipping is based on generated statistics related to pixel values in the first video signal and the second video signal.

4. The method of claim 3, wherein, upon determining that there is potential highlights clipping, the residual signal is generated according to the steps in claim 1, and otherwise, if it is not determined that there is potential highlights clipping, the following steps are performed instead:

generating with the processor a second prediction function to predict pixels of the first video signal in response to pixels of the second video signal, wherein the second prediction function is not adjusted to output a fixed output value for pixel values of the second video signal larger than the highlights threshold;

applying the second video signal to the second prediction function to generate pixel values of an estimated first video signal; and determining a residual signal based on the first video signal and the estimated first video signal.

5. The method of claim 3, wherein the generated statistics comprise a histogram of the pixel values in the second video signal, and a variance or standard deviation of pixel values in the first video signal.

6. The method of claim 5, wherein for the j-th frame a potential highlights clipping is determined if given a first value (U) and a threshold $T_h$, $D_j=1$, where $$D_j = \left( \left( \sum_{k=-L}^{L} ((M_j == U+k) \,\&\&\, (h[U+k] > T_h)) \right) \geq 1 \right),$$

the first value U denotes an upper bound for allowable pixel values in the second video signal, h[i] denotes the number of pixels in the second video signal whose value is i, L is a positive integer value, and $M_j$ denotes that pixel value in the second video signal for which the corresponding computed variance in the first video signal is maximum.

7. The method of claim 3, wherein the step to determine whether there is potential highlights clipping is based on generated statistics related to pixel values in the first video signal and the second video signal for a scene in the first video signal.

8. The method of claim 1, wherein the prediction function comprises a multi-segment predictor that uses piece-wise polynomial prediction and that comprises one polynomial predictor for each of multiple segments, wherein the prediction coefficients of each polynomial predictor are determined to minimize a distortion metric using the mean square error, MSE, as a prediction cost function, and wherein the highlights threshold comprises the starting point of the last segment in the multi-segment predictor.

9. The method of claim 1, wherein the highlights threshold equals a value of 85% of the maximum pixel value in the second video signal.

10. The method of claim 1, wherein determining the dark-regions threshold comprises:

computing a histogram (h[i]) of pixel values in the second video signal;

computing, for each bin of the histogram, a variance (var[i]) value of pixel values in the first video signal whose corresponding pixel value in the second video signal is in the respective bin of the histogram;

computing cumulative average values of the variance values;

computing difference values based on the cumulative average values; and determining the dark-regions threshold based on the computed difference values.

11. The method of claim 10, further comprising, before computing the variance values, generating interpolated histogram values for those computed histogram values that are equal to zero.

12. The method of claim 10, further comprising applying a smoothing filter to the computed variance values before computing the cumulative average values.

13. The method of claim 10, wherein computing difference values comprises computing difference values between two successive cumulative average values.

14. The method of claim 13, wherein determining the dark-regions threshold ($T_{SL}$) comprises computing:

$$T_{SL} = \arg\min_{i > W_H} \{\theta_i > \alpha \cdot \theta_W\},$$

where $\alpha$ denotes a positive scaling value, $W_L$ and $W_H$ denote threshold values, $$\theta_w = \max \{\theta_i | W_L \leq i \leq W_H\},$$

where $\theta_i = \hat{\sigma}_i - \hat{\sigma}_{i-1}$ denotes the computed difference values of the average cumulative values $\hat{\sigma}_i$.

15. The method of claim 10, further comprising computing a scene-based dark-regions threshold based on frame-based dark-region thresholds of two or more video frames within a scene.

16. The method of claim 15, wherein computing the scene-based dark regions threshold comprises computing the average of the frame-based dark-region thresholds of the two or more video frames in the scene.

17. An apparatus comprising a processor and configured to perform the methods recited in claim 1.

18. A non-transitory computer-readable storage medium having stored thereon computer-executable instructions for executing a method with one or more processors in accordance with claim 1.

* * * * *